United States Patent [19]

Taniguchi

[11] Patent Number: 5,725,626
[45] Date of Patent: Mar. 10, 1998

[54] METHOD FOR MANUFACTURING AN OPTICAL ELEMENT BY BONDING A PLURALITY OF ELEMENTS

[75] Inventor: Yasushi Taniguchi, Tokyo, Japan

[73] Assignee: Canon Kabushiki Kaisha, Tokyo, Japan

[21] Appl. No.: 162,794

[22] Filed: Dec. 7, 1993

Related U.S. Application Data

[63] Continuation of Ser. No. 857,122, Mar. 25, 1992, abandoned, which is a continuation of Ser. No. 445,125, Dec. 4, 1989, abandoned, which is a division of Ser. No. 61,551, Jun. 15, 1987, abandoned.

[30] Foreign Application Priority Data

| Jun. 18, 1986 | [JP] | Japan | 61-139974 |
| Jun. 18, 1986 | [JP] | Japan | 61-139975 |
| Jun. 18, 1986 | [JP] | Japan | 61-139976 |
| Jun. 20, 1986 | [JP] | Japan | 61-142855 |

[51] Int. Cl.$^6$ ............ C03C 27/10; C03C 17/23; C03C 17/30
[52] U.S. Cl. ............ 65/37; 65/43; 65/60.52; 65/60.8; 156/99; 156/326
[58] Field of Search ............ 65/17, 18.1, 36, 65/37, 901, 32.2, 43, 60.52, 60.8, 59.1, 17.1, 17.2; 264/261; 156/99, 307.3, 326

[56] References Cited

U.S. PATENT DOCUMENTS

| 1,335,024 | 3/1920 | Peschko | 65/59.1 |
| 2,382,660 | 8/1945 | Penberthy | 65/37 |
| 2,601,123 | 6/1952 | Moulton. | |
| 3,805,072 | 4/1974 | Goerens | 65/160 |
| 3,811,918 | 5/1974 | Levene | 65/901 |
| 3,927,165 | 12/1975 | Grochol | 65/901 |
| 4,162,151 | 7/1979 | Bhalla | 65/43 |
| 4,173,459 | 11/1979 | Aulich et al. | 65/901 |
| 4,334,941 | 6/1982 | Neely | 156/99 |
| 4,374,696 | 2/1983 | Schmidt | 156/329 |
| 4,415,364 | 11/1983 | Naito | 106/74 |
| 4,417,910 | 11/1983 | Passaret | 65/3.12 |
| 4,433,016 | 2/1984 | Neely | 156/99 |
| 4,452,635 | 6/1984 | Noshi | 106/74 |
| 4,474,429 | 10/1984 | Yoldas | 65/4.1 |
| 4,476,156 | 10/1984 | Brinker et al. | 65/60.52 |
| 4,498,919 | 2/1985 | Mann | 65/37 |
| 4,714,308 | 12/1987 | Sawamura et al. | 350/1.7 |

FOREIGN PATENT DOCUMENTS

| 6054929 | 3/1985 | Japan | 65/901 |
| 6065739 | 4/1985 | Japan | 65/901 |
| 60-264335 | 12/1985 | Japan | 65/901 |
| 1153299 | 5/1969 | United Kingdom | 65/901 |

OTHER PUBLICATIONS

High Laser Damage Threshold Porous Silica Antireflective Coating, I.M. Thomas, Applied Optics, vol. 25, No. 9, May 1, 1986.
Amorphous, Sumio Sakuhana, published by Kyouritsu Shuppan K.K., Nov. 25, 1983.
Silicon Resin, Isao Nakajima et al. published by Nikkan Kougyou Shinbunsha, Oct. 20, 1974.
Adhesion Encyclopedia, vol. 1, Ichiro Shibasaki, published by Koubunshi Kankoukai, Mar. 25, 1975.
"Optical interference coatings prepared from solution," R. W. Phillips et al., Applied Optics, vol. 20, No. 1, Jan. 1, 1981.
Grant & Hackh's Chemical Dictionary, 1987, p. 531 McGraw–Hill Book Company.
The Condensed Chemical Dictionary, Tenth Edition 1981, p. 23 & Title Page, Hawley.

*Primary Examiner*—Steven P. Griffin
*Attorney, Agent, or Firm*—Fitzpatrick, Cella, Harper & Scinto

[57] ABSTRACT

An optical element manufactured by bonding a plurality of elements by hydrolysis product of alcoholate, metal acid ester or metal hydrate colloid, and a method for manufacturing the same are disclosed.

8 Claims, 7 Drawing Sheets

METHOD FOR MANUFACTURING AN OPTICAL ELEMENT BY BONDING A PLURALITY OF ELEMENTS

This application is a continuation of application Ser. No. 07/857,122 filed Mar. 25, 1992, now abandoned, which is a continuation of application Ser. No. 07/445,125 filed Dec. 4, 1989, now abandoned, which is a division of application Ser. No. 07/061,551 filed Jun. 15, 1987, now abandoned.

BACKGROUND OF THE INVENTION

1. Field of the Invention

The present invention relates to a method for manufacturing an optical element by using alcoholate as bonding material.

The present invention relates to a method for manufacturing an optical element used for a transmissive optical element, particularly an optical element used in an ultraviolet range, by using Si-alcoholate as bonding material.

The present invention relates to a method for manufacturing an optical element by using a hydrolysis product of at least two metal alcoholates as bonding material so that a refractive index of a bonding layer may be selected from a wide range (for example 1.45~2.2).

2. Related Background Art

In the past, balsam, epoxy or ultraviolet ray cured bonding material has been used to bond light transmissive optical elements such as lenses or prisms. Such bonding material, however, does not have a matching refractive index with a substrate (optical element), the bonding layer is too thick, or optical design is difficult because a transmission factor in an ultraviolet range (200–400 nm) is low. Thus, the selection of the substrate is restricted.

For a high energy ultraviolet ray as represented by an Xma laser, the bonding material absorbs the ray. As a result, durability of the bonding material is low and the optical elements cannot be bonded. Accordingly, in the manufacturing process of the optical element. The only way to use an optical contact to bond the optical element. However, in order to get the optical contact, it is necessary that a surface roughness of a bonding surface be very small, for example, 1/100 of a wavelength. To this end, the surface of the optical element must be fully polished or a thin film must be formed on the optical element. However, when the thin film is used, a bonding strength is low, and the polishing is a troublesome work.

SUMMARY OF THE INVENTION

It is an object of the present invention to provide a method for manufacturing an optical element having a practical sufficiently high bonding strength, by using bonding material which is easily matched with a refractive index of a substrate.

It is another object of the present invention to provide a method for manufacturing an optical element by bonding a plurality of elements, Which optical element is suitable for a light in a wavelength range of 200–400 nm.

In order to achieve the above objects, the present method for manufacturing the optical element is characterized by bonding a plurality of elements by a hydrolysis product of at least one of metal alcoholate, metal acid ester and metal hydroxide colloid.

In accordance with one aspect of the present method for manufacturing the optical element used for the ultraviolet range, a plurality of elements are bonded by the hydrolysis product of silicon alcoholate.

In the bonding process by using the hydrolide of silicon alcoholate, if the element is made of a material other than fused silica ($SiO_2$), a $SiO_2$ layer is formed on a bonding surface of the element, and then the bonding process is performed. This process enhances the bonding strength.

In view of the features described above, the optical element manufactured by the present method meets the requirements for the bonding of the optical element used in the light transmissive optical system, that is ① the bonding strength is practically sufficiently high, ② the refractive index of the bonding material matches with that of the substrate, ③ the transmission factor of the bonding layer is high and absorption and scattering are not substantially included, ④ the bonding layer is very thin, and ⑤ the durability (particularly to laser) of the bonding layer is high. This is because the bonding layer of the optical element manufactured by the present method is similar to glass usually used as the substrate.

Since the metal alcoholate can maintain high precision in its chemical composition and provide homogeneous vitreous material, the optical characteristic of the optical element manufactured is not affected.

DETAILED DESCRIPTION OF THE PREFERRED EMBODIMENTS

Figure 1:
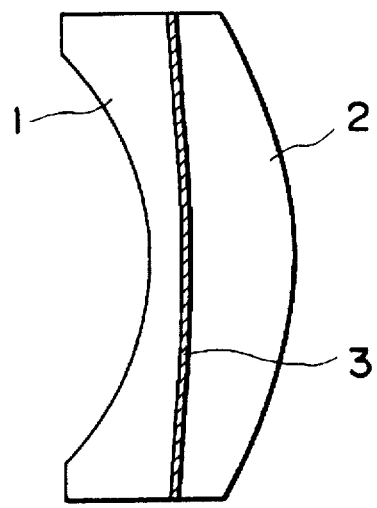
FIG. 1 shows a bonded lens manufactured by the present method for manufacturing the optical element.

FIG. 1 shows a typical bonded lens (composite lens) comprising fluorite ($CaF_2$) and synthetic silica ($SiO_2$). A synthetic silica lens 1 having a negative refractive index and a fluorite lens 2 having a positive refractive index are bonded by a bonding layer 3. The bonded lens may be used for a light of wavelength range of 200–400 nm.

In order to manufacture the bonded lens in accordance with the present invention, it is necessary to prepare metal alcoholate, preferably Si-alcoholate. Various types of Si-alcoholate may be used. For example, ethyl silicate $Si_5O_4(OC_2H_5)_{12}$ which is relatively easy to obtain may be used. $Si_nO_{n-1}(OR)_{2n+2}$ (where R is a substituted or non-substituted hydrocarbon radical, and n is no smaller than one) as represented by $Si_nO_{n-1}(OC_2H_5)_{2n+2}$ such as silicon tetraethoxide $Si(OC_2H_5)_4$, or Si-alcoholate such as $R_nSi(OR)_{4-n}$.

When Si-alcoholate is hydrolyzed, it produces $SiO_2$ which has substantially the same refractive index as that of synthesized silica End has bonding ability. In the present embodiment, it is used as the bonding material for the silica glass lens and the fluorite lens. Condition and catalyst for the hydrolysis of Si-alcoholate are not limited but it may be hydrolyzed in a usual manner.

After the hydrolysis, alcohol or ester solvent residues, such as low boiling point alcohol or ester (for example, ethyl alcohol or ester sulfate, volatizes after the bonding. In order to positively remove it, the assembly may be heated or vacuumed. If there is foreign material such as dust or impurity on the bonding surface, the bonding strength is lowered or it may be damaged by the laser. Accordingly, it is necessary to fully clean the bonding surface before the bonding process and filter the bonding material to remove the impurities. A clean room is preferable for a work environment.

In order to bond the silica lens 1 and the fluorite lens 2, the hydrolysis product of Si-alcoholate is coated to the bonding surfaces of the lenses. This may be done by a conventional method such as dropping the hydrolysis product onto the bonding surfaces and bonding them together. When it is desired to form a thin bonding layer such as 1 µm, the following method is preferable. The lenses are contacted together, the hydrolysis product of Si-alcoholate is injected into a clearance therebetween by an injector so that the hydrolysis product is spread over the entire bonding surfaces of the lenses by a capillarity. In this method, in order to spread the hydrolysis product of Si-alcoholate over the bonding surfaces and control the rate of formation of the film and the film thickness, it is necessary that the hydrolysis product of Si-alcoholate has an appropriate viscosity. This is attained by solving the hydrolysis product of metal alcoholate into a selected solution. The solution may be a high boiling point alcohol such as butyl alcohol, or ester.

Figure 7:
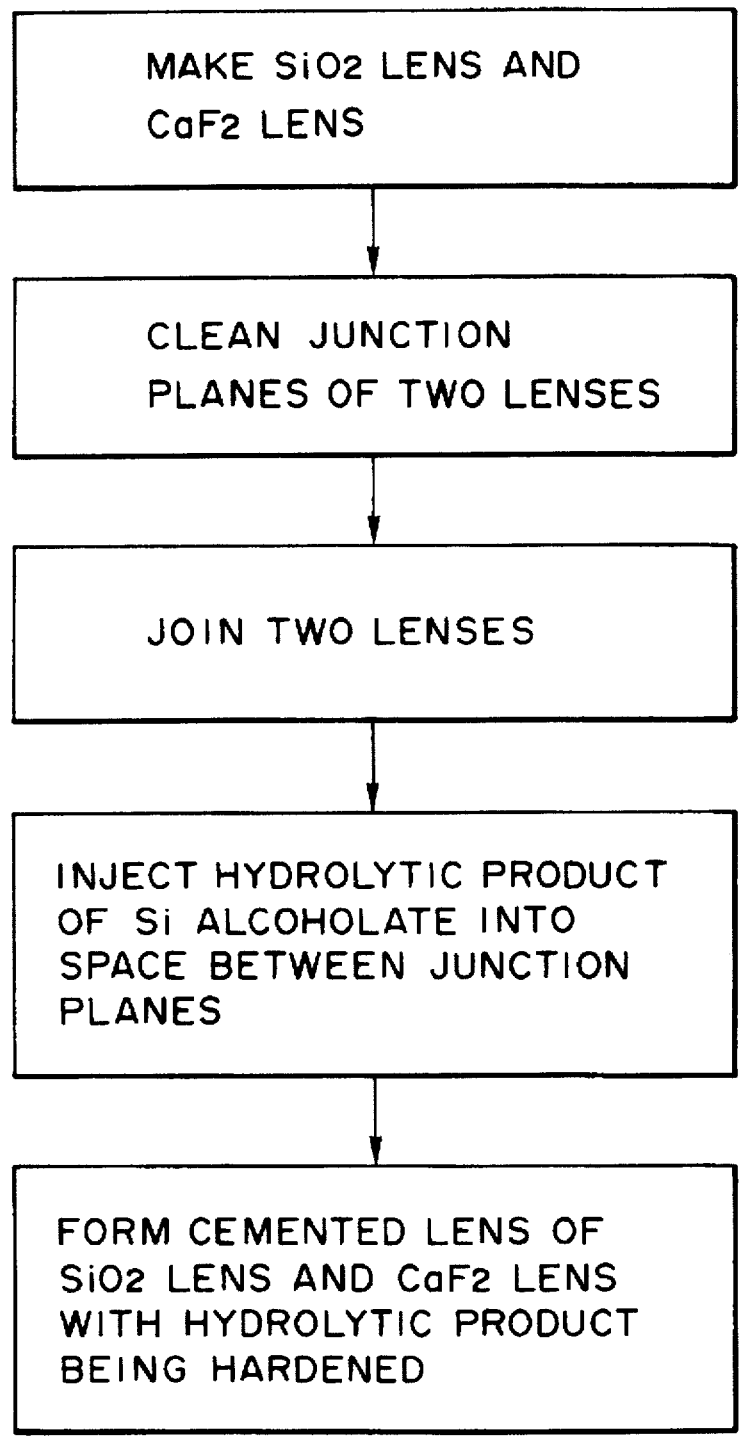
FIG. 7 shows a flow chart of the method for manufacturing the bonded lens shown in FIG. 1.

FIG. 7 shows a flow chart of the manufacturing method described above.

A refractive index of the silica lens 1 to the KrF Xma laser ($\lambda$=248 nm) is approximately 1.53. The bonding layer 3 of the bonded lens comprising the silica lens 1, and the fluorite lens 2 manufactured by the present method is an $SiO_2$ film having a thickness of 1 µm whose refractive index to the KrF Xma laser is approximately 1.53.

Accordingly, in the bonded lens shown in FIG. 1, the refractive index of the silica lens 1 matches to that of the bonding layer 3 and a bonded lens having a good optical property as the KrF Xma laser lens is provided.

By heating metal alcoholate after hydrolysis, it changes to an amorphous film of a metal oxide having more dehydration and polymerization, and approaches to the material of the optical element. For example, Si-alcoholate changes to an amorphous film of $SiO_2$ having deeply polymerized structure —Si—O—Si—. In the present invention, particularly in the present embodiment, the bonding layer without heating exhibits the same optical characteristic as that obtained by heating and practically sufficiently high bonding ability is presented. Therefore, heating is not usually required.

In the present method, the metal alcoholate such as Si-alcoholate which produces a compound which exhibits the essentially same refractive index as that of the optical element to be bonded by the hydrolysis may be used as the bonding material. Other metal alcoholates which can be used in the present method are Al isopropoxide, Zn propoxide and Ti isopropoxide. In certain cases, the metal alcoholate used as the bonding material may be selected without taking the refractive index of the product of the metal alcoholate into account. In this case, the bonding layer is oxidized and approaches to the material of the optical element. Accordingly, it is better than the balsam or epoxy bonding material from the standpoints of ①-⑤ above.

In the present invention, metal acid ester or metal hydroxide colloid may be used as the bonding material.

In the above embodiment, the optical elements are bonded together. Alternatively, an optical element and a metal element may be bonded by the present method.

The optical elements to be bonded by the present method include any element which condenses, reflects, refracts or interferes light, such as lens, prism, mirror or grating. Accordingly, the optical elements manufactured by the present method include those having the bonding process in their manufacturing process.

As described above, the present manufacturing method which uses the metal alcoholate as the bonding material for the optical element provides a high bonding strength, assures matching of the refractive indices of the bonding layer and the substrate, reduces the absorption of light by the bonding layer and prevents the reduction of the transmissivity. Accordingly, the present invention can be used very effectively in the manufacture of a variety of optical products.

Figure 2:
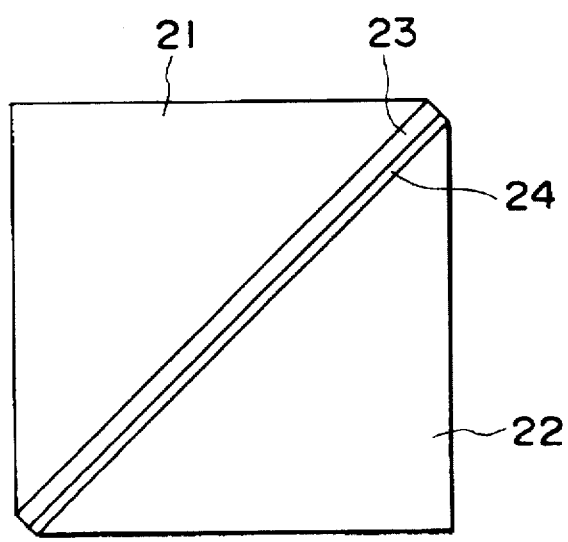
FIG. 2 shows a prism type polarized beam splitter manufactured by the present method.

FIG. 2 shows a prism type polarized beam splitter, which comprises a prism 21 having a polarized beam splitter film 23 formed thereon, a prism 22 and a hydrolysis product 24 of Si-alcoholate which bonds the prisms 21 and 22.

Figure 3:
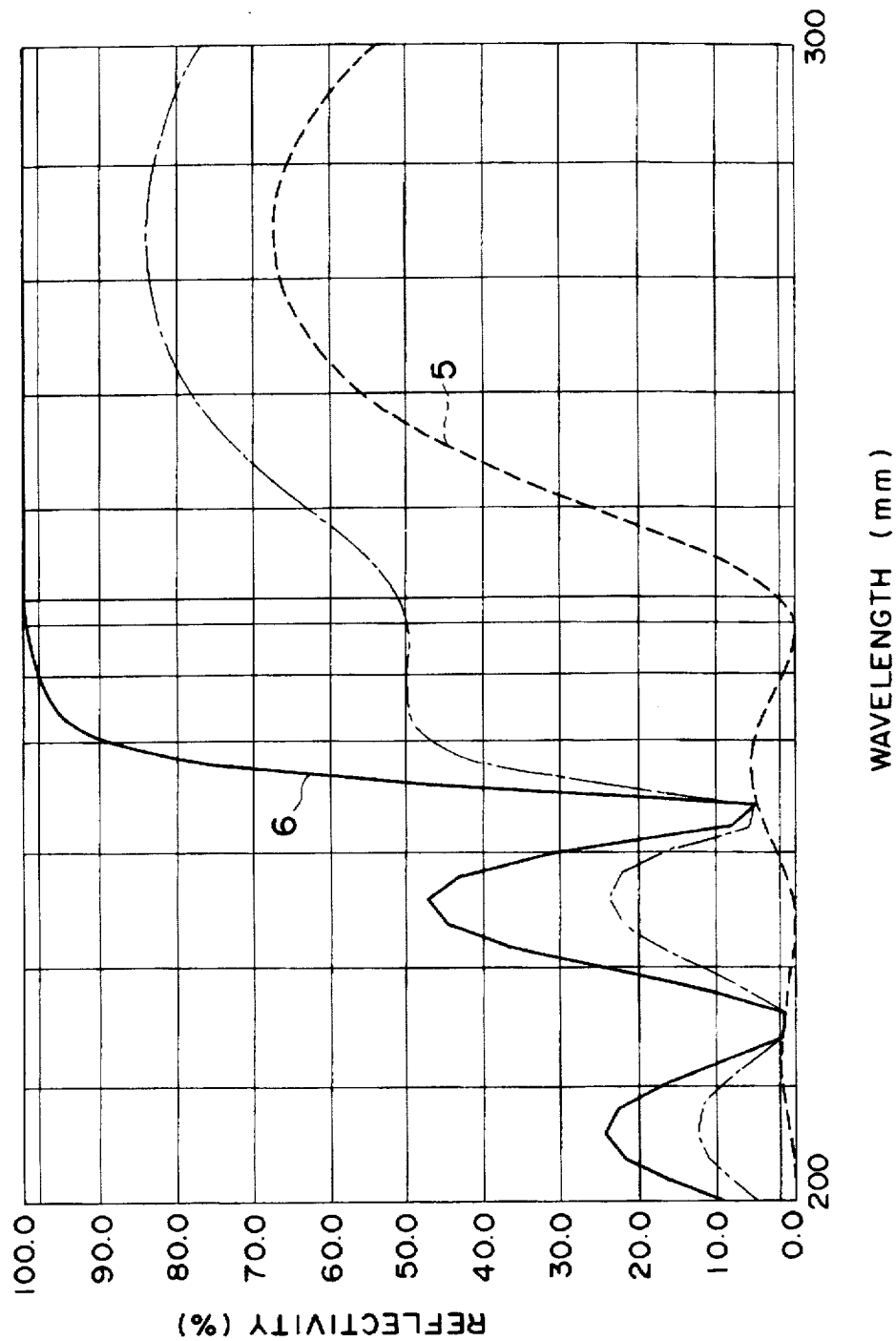
FIG. 3 shows reflection factor characteristics of P polarization component and S polarization component of the polarized beam splitter shown in FIG. 2, for a KrF Xma laser beam.

The prisms 21 and 22 are made of synthesized silica the polarized beam splitter film 23 formed on the prism 21 is a dielectric multi-layer film which is formed by vacuum deposition, sputtering or ion plating. A spectrograph of the polarized beam splitter is shown in FIG. 3, in which numeral 5 represents a reflection factor of a P polarization component and numeral 6 represents a reflection, factor of an S polarization component. The polarized beam splitter is designed for KrF Xma laser.

In the present embodiment, Si-alcoholate is again used to bond the prisms 21 and 22 of the polarized beam splitter. When Si-alcoholate is hydrolyzed, it changes to vitreous $SiO_2$ and presents bonding ability and does not essentially absorb a light in the ultraviolet range. Thus, it may be used as the bonding material. Since the hydrolysis product 24 of Si alcoholate and the silica glass of the prisms 21 and 22 are of the same composition, the refractive indices match, the affinity is high, and high bonding strength is provided.

Condition and catalyst for the hydrolysis of Si-alcoholate are not restricted and the hydrolysis may be carried out in a usual manner.

After the hydrolysis, alcohol or ester solvent residues such as low boiling point alcohol or ester (for example ethyl alcohol or ester sulfate, volatilizes after the bonding. In order to positively remove it, the assembly may be heated or vacuumed. If there is foreign material such as dust or impurity on the bonding surface, the bonding strength is lowered or it may be damaged by the laser. Accordingly, it is necessary to fully clean the bonding surface before the bonding process and filter the bonding material to remove the impurities. A clean room is preferable for a work environment.

In order to bond the prisms 21 and 22, the hydrolysis product 24 of Si-alcoholate is coated to the bonding surfaces of the lenses. This may be done by a conventional method such as dropping the hydrolysis product 24 onto the bonding surfaces and bonding them together. When it is desired to form a thin bonding layer such as 1 µm, the following method is preferable. The lenses are contacted together, the hydrolysis product 24 of Si-alcoholate is injected into a clearance therebetween by an injector so that the hydrolysis product 24 is spread over the entire bonding surfaces of the lenses by a capillarity. In this method, in order to spread the hydrolysis product of Si-alcoholate over the bonding surfaces and control the rate of formation of the film and the film thickness, it is necessary that the hydrolysis product of Si-alcoholate has an appropriate viscosity. This is attained by solving the hydrolysis product of metal alcoholate into a selected solution. The solution may be a high boiling point alcohol such as butyl alcohol, or ester.

By heating Si-alcoholate after the hydrolysis, it is dehydrated and polymerized and changes to an amorphous $SiO_2$ film and approaches to the material of the optical element. In the present invention, particularly in the present embodiment, the bonding layer without heating exhibits the same optical property as that obtained by the heating and has a practically sufficiently high bonding ability. Accordingly, heating is not necessary.

When the present invention is applied to the manufacture of Glan-Thomson, Glan-Tiller, or Wallstone prism and the components thereof are bonded by the hydrolysis product of Si-alcoholate, a prism which can be used in a shorter wavelength range than was usable by the prior art prism can be provided.

In the manufacturing method described above, when the optical element is manufactured by bonding the element primarily made of $SiO_2$ and the element having a metal or dielectric thin film formed thereon, a sufficiently high bonding strength may not be attained in a certain case depending on the composition of the thin film serving as the bonding surface and a difference between surface roughnesses of the bonding surfaces, an embodiment shown below improves such a deficiency. When Si-alcoholate is used as the bonding material in the manufacture of the optical element, an $SiO_2$ layer is formed on at least one of the pair of bonding surfaces so that the bonding strength of Si-alcoholate is enhanced independently from the surface condition of the bonding surfaces, without affecting the optical property of the optical element.

Figure 4:
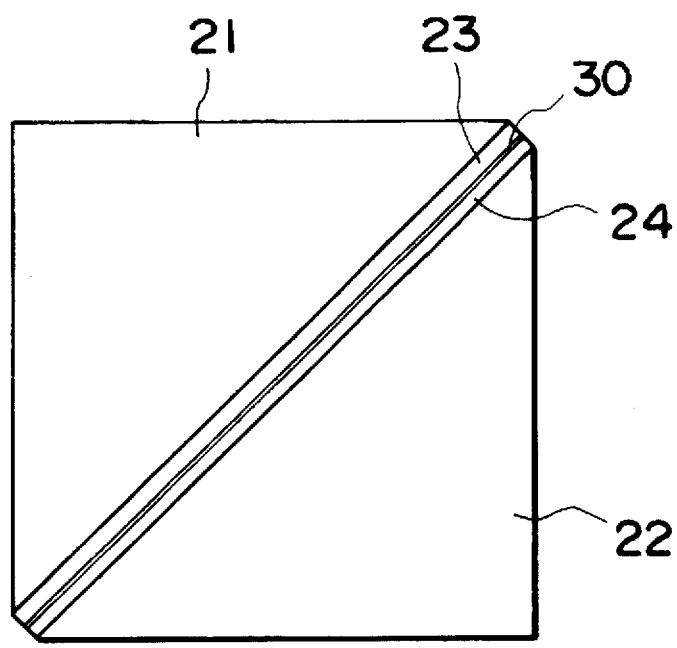
FIG. 4 shows another prism type polarized beam splitter manufactured by the present method.

FIG. 4 shows a prism type polarized beam splitter for the KrF Xma laser. It comprises a prism 21 having a multi-layer polarized beam splitter film 23 formed thereon, a prism 22 and bonding material which bonds the prisms 21 and 22. When the polarized beam splitter film 23 has a layer structure shown in Table 1, that is, a high refractive index material $ZrO_2$ and a low refractive index material $SiO_2$ are alternately formed with the outermost layer being the $ZrO_2$ layer, the bonding strength of the hydrolysis product 24 of Si-alcoholate which bonds the prism 21 having the polarized beam splitter film 23 formed thereon and the prism 22 may not be sufficiently high. When the polarized beam splitter film 23 has the $SiO_2$ layer as the outermost layer 30 as shown in Table 2, the bonding strength for the prisms by the hydrolysis product of Si-alcoholate is significantly improved.

TABLE 1

|  | Refractive Index | Optical Film Thickness | Film Material |
| --- | --- | --- | --- |
| Substrate | 1.51 | — | (Synthesized Silica) |
| Layer 1 | 2.12 | 80 (nm) | $ZrO_2$ |
| 2 | 1.53 | 100.2 | $SiO_2$ |

TABLE 1-continued

|  | Refractive Index | Optical Film Thickness | Film Material |
| --- | --- | --- | --- |
| 3 | 2.12 | 80 | $ZrO_2$ |
| 4 | 1.53 | 100.2 | $SiO_2$ |
| 5 | 2.12 | 80 | $ZrO_2$ |
| 6 | 1.53 | 100.2 | $SiO_2$ |
| 7 | 2.12 | 80 | $ZrO_2$ |
| 8 | 1.53 | 100.2 | $SiO_2$ |
| 9 | 2.12 | 80 | $ZrO_2$ |
| 10 | 1.53 | 100.2 | $SiO_2$ |
| 11 | 2.12 | 80 | $ZrO_2$ |
| 12 | 1.53 | 100.2 | $SiO_2$ |
| 13 | 2.12 | 80 | $ZrO_2$ |
| 14 | 1.53 | 100.2 | $SiO_2$ |
| 15 | 2.12 | 80 | $ZrO_2$ |
| Bonding Layer | 1.51 | — | Si-alcoholate |
| Substrate | 1.51 | — | (Synthesized Silica) |

Note: Refractive index is for wavelength of 248 nm.

TABLE 2

|  | Refractive Index | Optical Film Thickness | Film Material |
| --- | --- | --- | --- |
| Substrate | 1.51 | — | (Synthesized Silica) |
| Layer 1 | 2.12 | 80 (nm) | $ZrO_2$ |
| 2 | 1.53 | 100.2 | $SiO_2$ |
| 3 | 2.12 | 80 | $ZrO_2$ |
| 4 | 1.53 | 100.2 | $SiO_2$ |
| 5 | 2.12 | 80 | $ZrO_2$ |
| 6 | 1.53 | 100.2 | $SiO_2$ |
| 7 | 2.12 | 80 | $ZrO_2$ |
| 8 | 1.53 | 100.2 | $SiO_2$ |
| 9 | 2.12 | 80 | $ZrO_2$ |
| 10 | 1.53 | 100.2 | $SiO_2$ |
| 11 | 2.12 | 80 | $ZrO_2$ |
| 12 | 1.53 | 100.2 | $SiO_2$ |
| 13 | 2.12 | 80 | $ZrO_2$ |
| 14 | 1.53 | 100.2 | $SiO_2$ |
| 15 | 2.12 | 80 | $ZrO_2$ |
| 16 | 1.53 | 200.4 | $SiO_2$ |
| Bonding Layer | 1.51 | — | Si-alcoholate |
| Substrate | 1.51 | — | (Synthesized Silica) |

Note: Refractive index is for wavelength of 248 nm.

The enhancement of the bonding strength by the present embodiment is for the following reason. The hydrolysis product of Si-alcoholate used as the bonding material is dehydrated and polymerized and changes to a $SiO_2$ amorphous film, which presents a bonding ability. The composition of the bonding surface of the prism 22 made of synthesized silica has essentially the same composition as the amorphous film. On the other hand, the bonding surface of the prism 21 having the polarized beam splitter film 23 formed thereon is $ZrO_2$ in the layer structure shown in Table 1. It is an oxide but the material is different. Accordingly, affinity is low. When the surface of $ZrO_2$ is rough, the affinity is further lowered and the bonding strength is considerably lowered. In the layer structure shown in Table 2 in accordance with the present invention, the outermost layer 30 of the prism 21 having the polarized beam splitter film 23 formed thereon is $SiO_2$. Thus, the affinity to the bonding layer is significantly enhanced. As a result, high bonding strength is maintained even if the surface roughness of the bonding surface increases.

Figure 5:
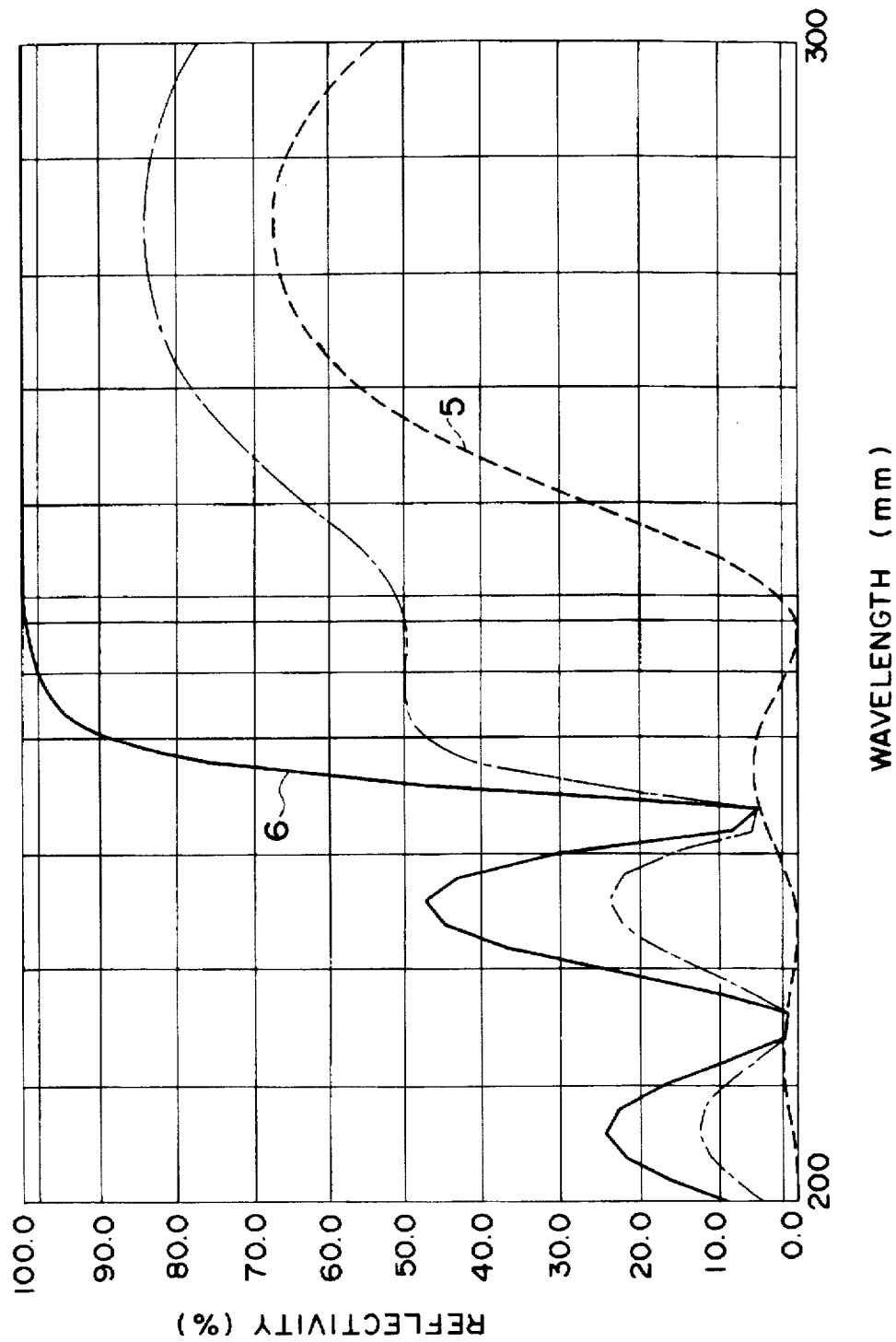
FIGS. 5 and 6 show reflection factor characteristics of P polarization component and S polarization component of polarized beam splitters having layer structures shown in Tables 1 and 2.
Figure 6:
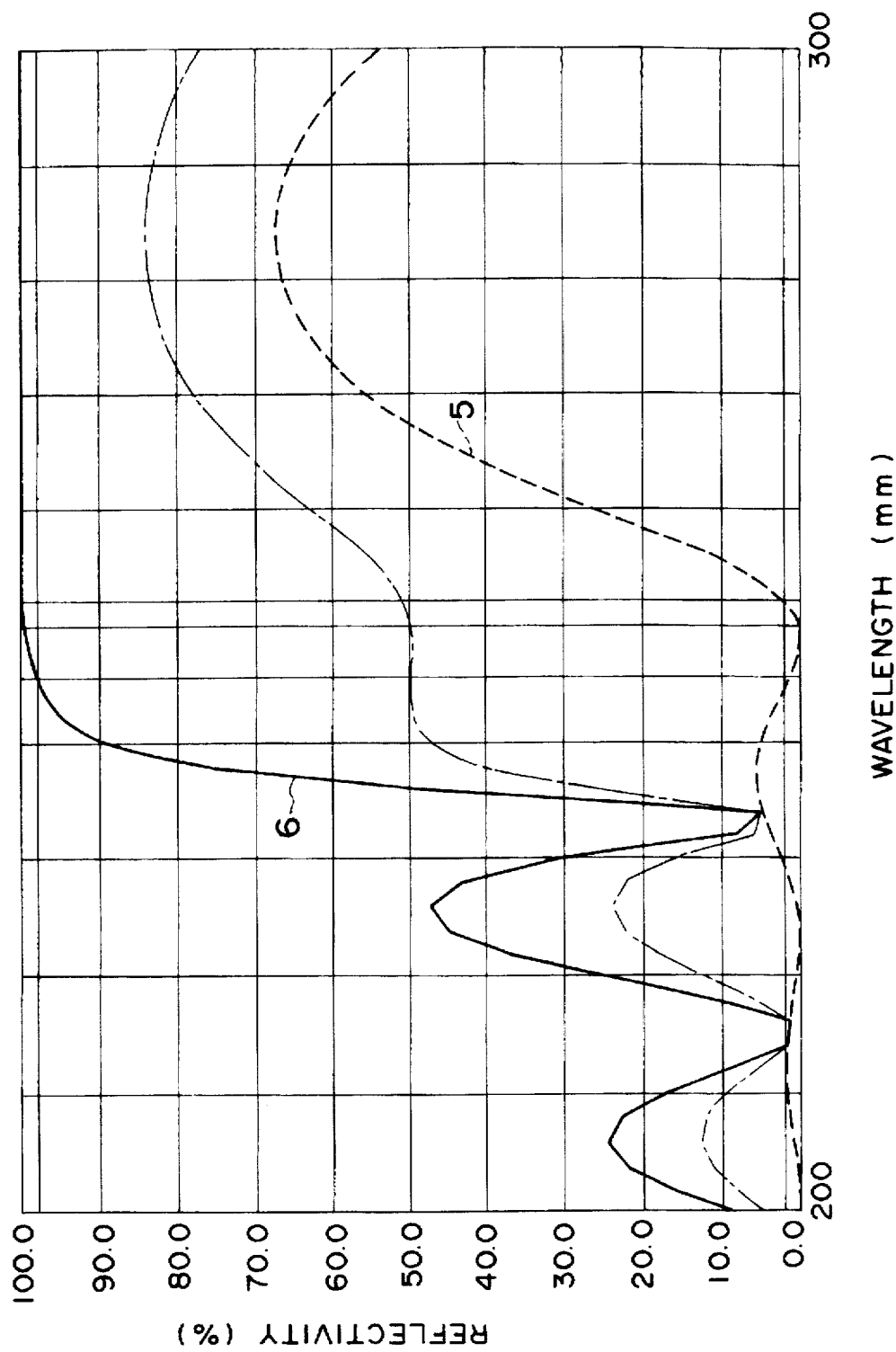

Spectrographs of the polarized beam splitters having the layer structures of Tables 1 and 2 are shown in FIGS. 5 and 6, respectively. A curve 5 represents a reflection factor of P polarization component, and a curve 6 shows a reflection factor of S polarization component. When $SiO_2$ is added, there is no change in the spectrograph and the S polarization component and P polarization component at KrF Xma laser ($\lambda=248$ nm) are fully separated.

In the present method, the $SiO_2$ layer may be formed by vacuum deposition, sputtering or ion plating. The thickness of the $SiO_2$ layer is preferably m/2 (m=1, 2, 3, ...) of a design reference wavelength of the optical element while taking the optical characteristic of the optical element into account.

The method for manufacturing the prism type polarized beam splitter shown in FIG. 4 is same as that of the prism type polarized beam splitter shown in FIG. 2, except that an $SiO_2$ layer is used as the outermost layer 30 of the polarized beam splitter film 23.

Accordingly, the manufacturing method of the present embodiment can be applied to manufacture the optical element which is manufactured by bonding optical elements having functions of condensing, reflecting, refracting or interfering the light, so long as the function of the product is within the practical acceptable range. For example, an optical element having a metal film formed thereon such as a metal half-mirror or an optical element having no dielectric film or metal film formed thereon (for example, lens or prism primarily made of oxide other than $SiO_2$) may be used.

In the present invention, the $SiO_2$ layers may be formed on both bonding surfaces as required.

As described above, in accordance with the present method for manufacturing the optical element, the $SiO_2$ layer is formed on the surface of the optical element which serves as the bonding surface, and Si-alcoholate is used as the bonding material. Accordingly, the bonding strength between the elements is significantly enhanced.

Figure 8:
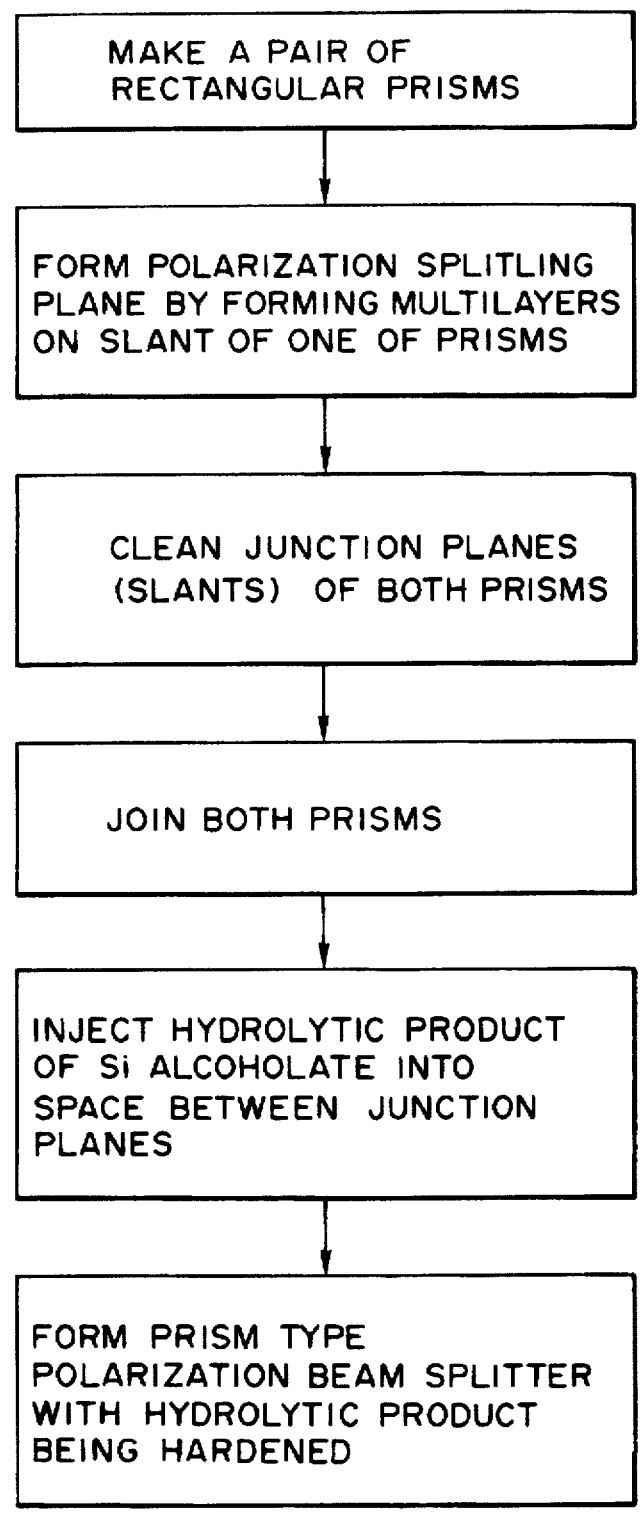
FIG. 8 shows a flow chart of the method for manufacturing the polarized beam splitters shown in FIGS. 2 and 4.

FIG. 8 shows a flow chart of the manufacturing method of the present invention for the prism type polarized beam splitters shown in FIGS. 2 and 4.

In the manufacture of the bonded lens shown in FIG. 1, the present method may be used. Namely, the $SiO_2$ film is formed on the bonding surface of the fluorite lens 2 and then the silica lens 1 and the fluorite lens 2 are bonded by the hydrolysis product of Si-alcoholate. Thus, the bonding strength is further enhanced.

Other embodiment of the present invention is described. An optical element manufactured in the present method is the prism type polarized beam splitter shown in FIG. 2.

As described above, the polarized beam splitter of this type comprises the prism 21 having a multi-layer polarized beam splitter film 23 formed thereon and the prism 22, bonded together by the bonding material (see FIG. 2).

In the present embodiment, in order to bond the two prisms, a condensate of ethyl silicate $Si_nO_{n-1}(OC_2H_5)$ (n=5) which is Si-alcoholate and Ti-isoproxide which is Ti-alcoholate are prepared.

Mixture of those two alcoholates is hydrolyzed. The product exhibits a bonding ability and a refractive index thereof varies between n=1.45~2.2 by changing a mixing ratio of the alcoholates. It is necessary to determine the mixing ratio of the alcoholates so that the hydrolysis product 24 of the alcoholate mixture has substantially the same refractive index as the prisms 21 and 24 to be bonded. The prisms used in the present embodiment are BK-7 which have a refractive index of 1.52. Thus, the mixing ratio (mole ratio) is selected to be Si-alcoholate 4 to Ti-isoproxide 1 so that the refractive index of the bonding material is substantially equal to 1.52.

The alcoholates mixed at the above ratio are hydrolyzed and the two prisms 21 and 22 having the polarization film formed on one of them are bonded by the hydrolysis product. In this manner, the polarized beam splitter shown in FIG. 2 is manufactured.

After the hydrolysis, alcohol or ester solvent residues but low boiling point alcohol or ester (for example, ethyl alcohol or ester sulfate volatilizes after the bonding. In order to positively remove it, the assembly may be heated or vacuumed. If there is foreign material such as dust or impurity on the bonding surface, the bonding strength is lowered or it may be damaged by the laser. Accordingly, it is necessary to fully clean the bonding surface before the bonding process and filter the bonding material to remove the impurities. A clean room is preferable for a work environment.

In order to bond the prisms 21 and 22, the hydrolysis product 24 of Si-alcoholate is coated to the bonding surfaces of the lenses. This may be done by a conventional method such as dropping the hydrolysis product 24 onto the bonding surfaces and bonding them together. When it is desired to form a thin bonding layer such as 1 µm, the following method is preferable. The lenses are contacted together, the hydrolysis product 24 of Si-alcoholate is injected into a clearance therebetween by an injector so that the hydrolysis product 24 is spread over the entire bonding surfaces of the lenses by a capillarity. In this method, in order to spread the hydrolysis product of Si-alcoholate over the bonding surfaces and control the rate of formation of the film and the film thickness, it is necessary that the hydrolysis product of Si-alcoholate has an appropriate viscosity. This is attained by solving the hydrolysis product of metal alcoholate into a selected solution. The solution may be a high boiling point alcohol such as butyl alcohol, or ester.

By heating metal alcoholate after the hydrolysis, it is dehydrated and polymerized and changes to an amorphous metal oxide film and approaches to the material of the optical element. In the present invention, particularly in the present embodiment, the bonding layer without heating exhibits the same optical property as that obtained by the heating and has a practical sufficiently high bonding ability. Accordingly, heating is not necessary.

In the present invention, the alcoholates are not limited to Si-alcoholate and Ti-alcoholate but hydrolysis product of a mixture of any two or more metal alcoholates may be used as the bonding material. The metal alcoholate which can be used in the present invention is represented by $M(OR)_n$ for single alcoholate, where M is a metal (Si, Ti, Al, Zn, Ta, etc.) and $(OR)_n$ is alcohoxyl radical. For mixed metal alcoholate, for example, Si and M(:Ti, Al, Zr) at a mixing ratio of 4/1, it is represented by $(Si_{4n/5} M_{n/5}O_{n-1}(OR)2n+2$. Specifically, $Si(O \cdot C_2H_5)_4$ silicon tetraethoxide, $Al(O \cdot isoC_3H_7)_3$ aluminum isopropoxyde, or $Ti(O \cdot isoC_3H_7)_4$ titanium isopropoxide may be used.

As described in Applied Optics vol. 20, No. 1, pages 40–47 by Roger W. Phillips and Jerry W. Doodds, the refractive index of the mixed alcoholate film of the metal alcoholates is variable between 1.45 and 2.0 for the hydrolysis product of Si and Zr mixed alcoholate, and between 1.45 and 1.6 for the hydrolysis product of Si and Al mixed alcoholate.

The optical element to be bonded by the present method includes any element which condenses, reflects, refracts or interferes light. It includes lens and prism as well as mirror and grating. Accordingly, the optical element manufactured by the present invention includes those having a bonding process in the manufacturing process. Preferably, the material of the optical element used in the present method primarily consists of oxide.

The present invention is applicable to manufacture not only the optical element having elements bonded together but also an optical element comprising an optical element and a metal element.

As described above, in accordance with the present invention, the hydrolysis product of the mixed metal alcoholate which allows control of the refractive index over a wide range (for example 1.45–2.20) is used as the bonding material. Accordingly, the refractive indices of the bonding layer and the substrate can be readily matched irrespective of the type of substrate, the optical design is facilitated and optical property of the optical element is improved. Further, the material of the optical element can be freely selected.

I claim:

1. A method for manufacturing an optical device for transmitting light in an ultraviolet range comprising the steps of:

(a) selecting a first optical component made of silica;
    (b) selecting a second optical component made of a material other than a silica, said material being transparent against light in an ultraviolet range;
    (c) cleaning surfaces of said first optical component and said second optical component of said device and forming a silica film on a bonding surface of said second optical component;
    (d) providing a hydrolysis product of a silicon alcoholate, said hydrolysis product comprising (i) an amorphous silicon oxide and (ii) a volatilizable liquid;
    (e) introducing said hydrolysis product of the silicon alcoholate by capillary action in a space between said first optical component and the silica film on said second optical component; and
    (f) contacting said first optical component and the silica film on said second optical component with said hydrolysis product of the silicon alcoholate in the space between said first optical component and the silica film on said second optical component, thereby joining said first optical component and said second optical component by forming a bond of said amorphous silicon oxide between said first optical component and said second optical component and volatilizing said volatilizable liquid.

2. A method of manufacturing an optical device according to claim 1, wherein said second optical component is made of fluorite.

3. A method for manufacturing an optical device for transmitting light in an ultraviolet range comprising the steps of:

(a) selecting a first lens made of silica;
    (b) selecting a second lens made of a material other than a silica, said material being transparent against light in an ultraviolet range;
    (c) cleaning surfaces of said first lens and said second lens of said device and forming a silica film on a bonding surface of said second lens;
    (d) providing a hydrolysis product of a silicon alcoholate, said hydrolysis product comprising (i) an amorphous silicon oxide and (ii) a volatilizable liquid;
    (e) introducing said hydrolysis product of the silicon alcoholate by capillary action in a space between said first lens and the silica film on said second lens; and
    (f) contacting said first lens and the silica film on said second lens with said hydrolysis product of the silicon alcoholate in said space between said first lens and the silica film on said second lens thereby joining said first lens and said second lens by forming a bond of said amorphous silicon oxide between said first lens and said second lens and volatilizing said volatilizable liquid.

4. A method for manufacturing an optical device according to claim 3, wherein said second lens is made of fluorite.

5. A method for manufacturing an optical device for transmitting light in an ultraviolet range comprising the steps of:

(a) selecting a first optical component made of silica;
    (b) selecting a second optical component made of a material other than a silica, said material being transparent against light in an ultraviolet range;
    (c) cleaning surfaces of said first optical component and said second optical component of said device and forming a silica film on a bonding surface of said second optical component;
    (d) providing a hydrolysis product of a silicon alcoholate, said hydrolysis product comprising (i) an amorphous silicon oxide and (ii) a volatilizable liquid;
    (e) introducing said hydrolysis product of the silicon alcoholate in a space between said first optical component and the silica film on said second optical component; and
    (f) contacting said first optical component and the silica film on said second optical component with said hydrolysis product of the silicon alcoholate in the space between said first optical component and the silica film on said second optical component, thereby joining said first optical component and said second optical component by forming a bond of said amorphous silicon oxide between said first optical component and said second optical component and volatilizing said volatilizable liquid.

6. A method of manufacturing an optical device according to claim 5, wherein said second optical component is made of fluorite.

7. A method for manufacturing an optical device for transmitting light in an ultraviolet range comprising the steps of:

(a) selecting a first lens made of silica;
    (b) selecting a second lens made of a material other than a silica, said material being transparent against light in an ultraviolet range;
    (c) cleaning surfaces of said first lens and said second lens of said device and forming a silica film on a bonding surface of said second lens;
    (d) providing a hydrolysis product of a silicon alcoholate, said hydrolysis product comprising (i) an amorphous silicon oxide and (ii) a volatilizable liquid;
    (e) introducing said hydrolysis product of the silicon alcoholate in a space between said first lens and the silica film on said second lens; and
    (f) contacting said first lens and the silica film on said second lens with said hydrolysis product of the silicon alcoholate in said space between said first lens and the silica film on said second lens, thereby joining said first lens and said second lens by forming a bond of said amorphous silicon oxide between said first lens and said second lens and volatilizing said volatilizable liquid.

8. A method of manufacturing an optical device according to claim 7, wherein said second lens is made of fluorite.

\* \* \* \* \*